United States Patent [19]

Paulson

[11] Patent Number: 4,771,955
[45] Date of Patent: Sep. 20, 1988

[54] PEPPER MILL CLOSURE

[76] Inventor: John K. Paulson, 14390 SW. Uplands Dr., Lake Oswego, Oreg. 97034

[21] Appl. No.: 548,789

[22] Filed: Nov. 4, 1983

Related U.S. Application Data

[63] Continuation of Ser. No. 372,922, Apr. 29, 1982, abandoned.

[51] Int. Cl.$^4$ .............................................. A47J 42/04
[52] U.S. Cl. .................................................. 241/169.1
[58] Field of Search .................. 241/69, 70, 88, 169.1, 241/168, DIG. 27, 169.2, 199.12; 222/142.1–142.9

[56] References Cited

U.S. PATENT DOCUMENTS

| | | | |
|---|---|---|---|
| 110,473 | 12/1870 | Kennedy | 222/142.4 X |
| 600,262 | 3/1898 | Hamfeldt | 222/510 |
| 617,490 | 1/1899 | Lawton | 222/510 X |
| 954,206 | 4/1910 | Rau | 241/168 |
| 961,661 | 6/1910 | Turner | 241/168 |
| 1,354,626 | 10/1920 | Service | 222/227 |
| 1,588,552 | 6/1926 | Sprinkle | 222/142.7 |
| 2,782,998 | 2/1957 | Hastings, Jr. | 241/169.1 |
| 2,876,956 | 3/1959 | Bentley | 241/168 |
| 3,633,834 | 1/1972 | Nissen | 241/169.1 |

Primary Examiner—Mark Rosenbaum
Attorney, Agent, or Firm—Olson and Olson

[57] ABSTRACT

A pepper mill is provided with an end closure for releasably closing the outfeed opening of the pepper mill against unintentional discharge of ground pepper therefrom. The closure apparatus of this invention is configured as a mechanically operated shield, either integral with a removably attachable to the outfeed end of the pepper mill, the shield serving to selectively permit or prevent passage of ground pepper out of the mill.

5 Claims, 2 Drawing Sheets

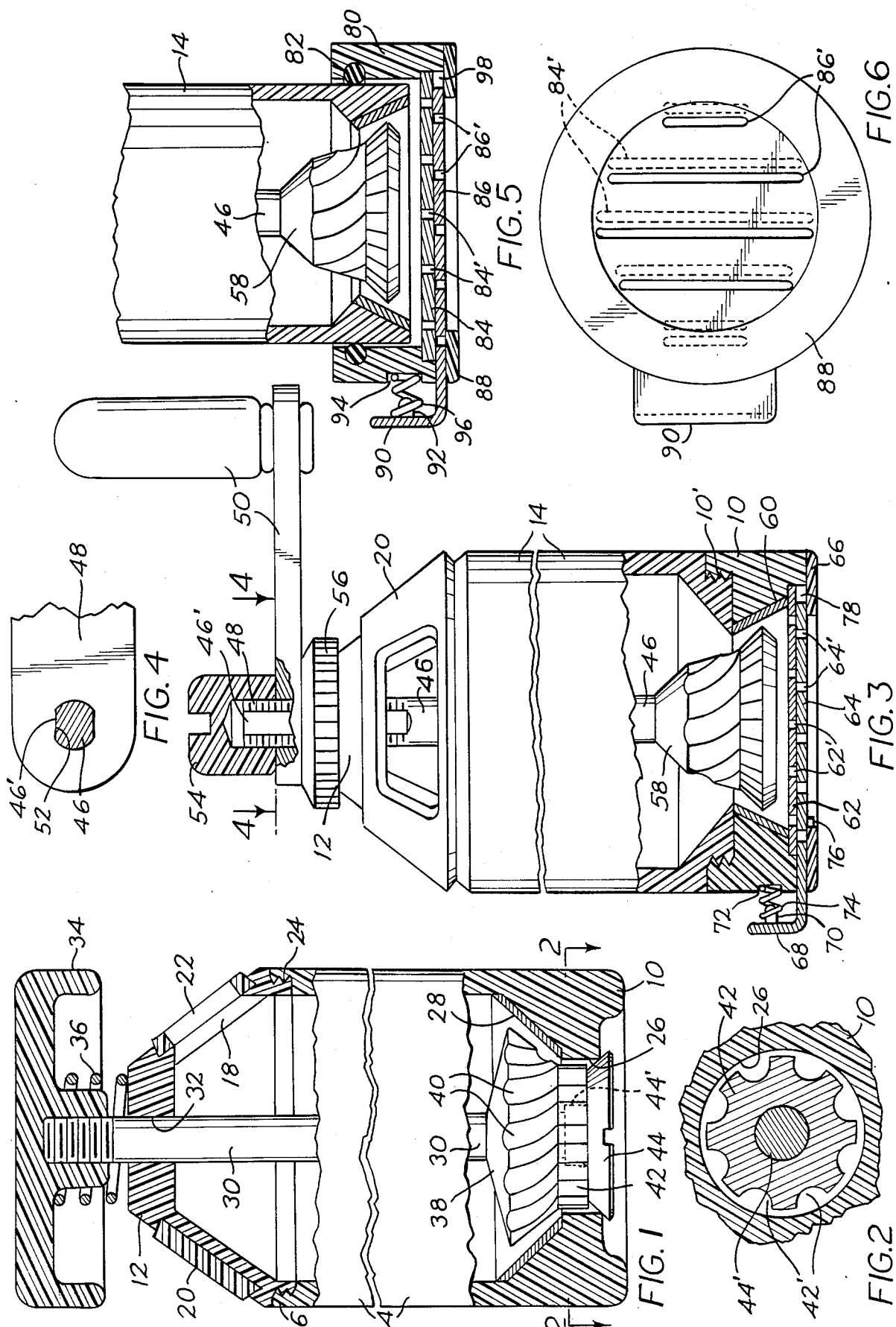

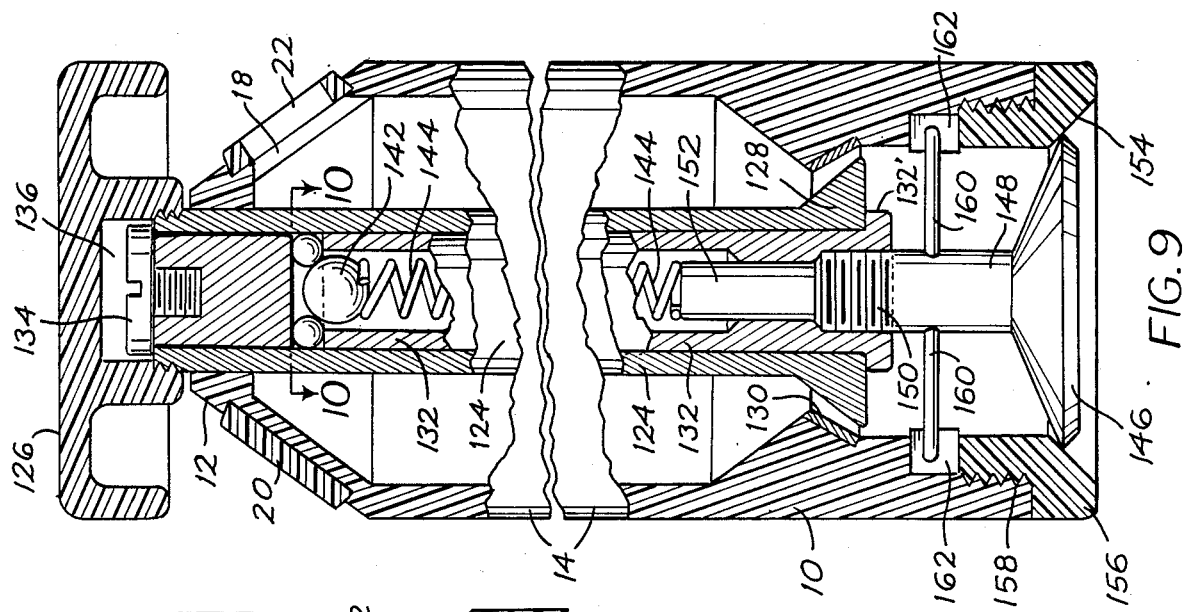
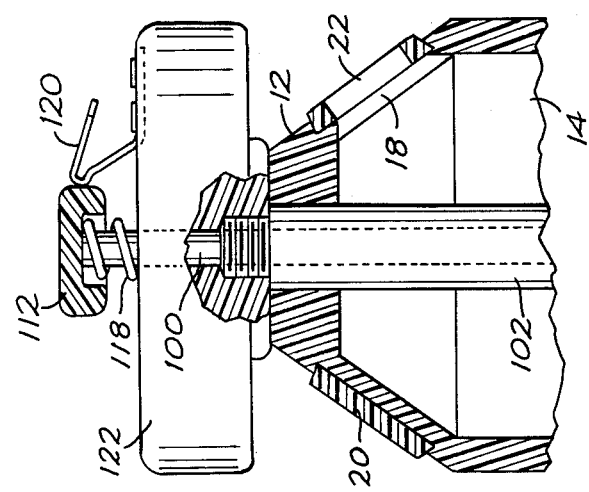
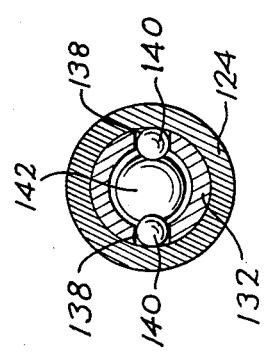
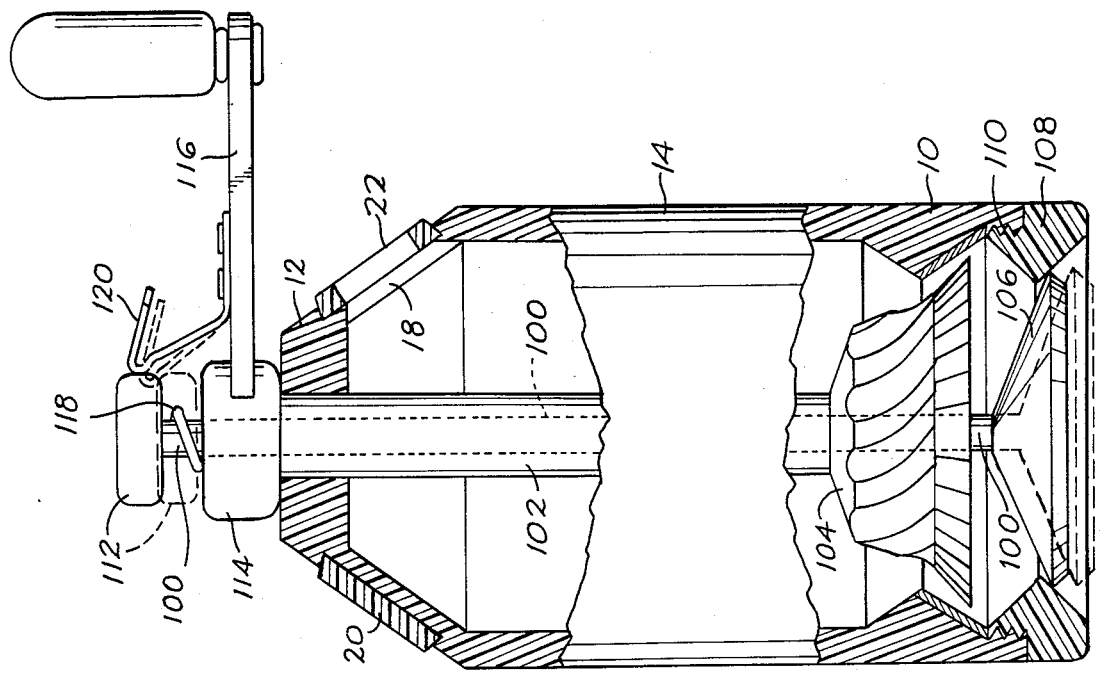

PEPPER MILL CLOSURE

This application is a continuation of application Ser. No. 372,922, filed 4/29/82, now abandoned.

BACKGROUND OF THE INVENTION

This invention relates to pepper mills, and more particularly to a novel pepper mill end closure which is arranged to prevent undesirable discharge of ground pepper from the mill while not in use.

As is well known, conventional grinder type pepper mills are distinctly characterized by the common fault of discharging ground pepper while not in use. In ordinary use, these mills grind whole pepper corns into small particles which subsequently fall from the outfeed opening of the mill onto a desired food. However, after use, there is inevitably an amount of ground pepper, either in the form of small bits or dust, which remains clinging to various parts of the mill. Without fail this material becomes disloged and falls onto the table on which the mill is placed between uses. The resulting mess is not only unsightly, but requires constant attention in keeping the table surface clean.

The applicant is not aware of any device in the prior art which is configured integral with or adaptable to conventional pepper mills for the purpose of closing the outfeed end of the pepper mill in order to prevent undesirable spillage of ground pepper from the mill after use and during storage.

SUMMARY OF THE INVENTION

In its basic concept, this invention provides a pepper mill end closure mechanism arranged to releasably intercept the outfeed opening of the pepper mill.

It is by virtue of the foregoing basic concept that the principle objective of this invention is achieved: namely, to prevent the unintentional discharge of ground pepper from the pepper mill.

Another object of this invention is to provide a pepper mill end closure of the class described which is operable automatically by rotation of the grinder.

Another object of this invention is the provision of a pepper mill end closure of the class described which may be operated independently of the operation of the grinder.

A further object of this invention is to provide a pepper mill end closure of the class described which is configured for attachment to a conventional pepper mill.

A still further object of the invention is the provision of a pepper mill of the class described which is of simplified construction for economical manufacture.

The foregoing and other objects and advantages of this invention will appear from the following detailed description, taken in connection with the accompanying drawings of preferred embodiments.

BRIEF DESCRIPTION OF THE DRAWINGS

FIG. 1 is a foreshortened side elevation of a pepper mill that incorporates a closure embodying features of this invention, parts being broken away to disclose internal structural details.

FIG. 2 is a fragmentary horizontal section taken on the line 2—2 in FIG. 1.

FIG. 3 is a foreshortened side elevation of another embodiment of the pepper mill of this invention, the upper and lower portions of the mill being broken away to disclose internal structural details.

FIG. 4 is a fragmentary sectional view taken on the line 4—4 in FIG. 3.

FIG. 5 is a fragmentary side elevation, partly broken away, of a pepper mill provided with an end closure assembly arranged for removable attachment thereto.

FIG. 6 is a bottom plan view of the end closure assembly of FIG. 5.

FIG. 7 is a side elevation, partly broken away, of another embodiment of a pepper mill of this invention.

FIG. 8 is a fragmentary side elevation, partly broken away, of the mill embodied in FIG. 7, showing a different hand crank configuration.

FIG. 9 is a foreshortened side elevation, partly in section, of still another embodiment of the pepper mill utilizing an end closure mechanism which is operable automatically by rotation of the grinder handle.

FIG. 10 is a horizontal section of the friction drive ball assembly of the mill of FIG. 9, taken on the line 10—10 in FIG. 10.

DESCRIPTION OF THE PREFERRED EMBODIMENTS

As illustrated in the drawings, a pepper mill typically includes a hollow body which comprises a base portion 10, a top portion 12 and an interconnection side wall 14, which together form a pepper corn reservoir 16. A reservoir filler opening 18 is provided through the top portion 12, and is selectively closed by an apertured filler ring 20 which may be moved to positions in which the filler opening 18 registers with the aperture 22 in the ring, or is covered by the ring, as desired.

The pepper mill illustrated in FIG. 1 includes means by which the top portion 12 may be attached removably to the side wall 14. This is provided by threaded connection 24, as illustrated, although it may be provided by a conventional fit connection. This detachable construction provides for simplified assembly and disassembly of the mill during manufacture and cleaning, when necessary.

The base portion 10 is provided with a centrally located circular opening 26. The upper surface of the base portion projects angularly downward inwardly from the wall 14, and mounted thereto is a metal grinder anvil 28.

The pepper mill of FIG. 1 also includes a grinder shaft 30 arranged to extend along the longitudinal centerline of the mill and through an opening 32 provided in the top 12. The upper portion of the shaft 30 is threaded for receiving an operator knob 34. A tensioning spring 36 is interposed between the knob 34 and the top 12, for resiliently urging the knob and shaft upward for the purpose explained hereinafter.

A grinder rotor 38, including pepper corn feed grooves 40, is mounted to the shaft 30 for rotation therewith. As illustrated, the grinder rotor is provided with a grinding surface arranged to cooperate with the metal grinder anvil 28. The grinder rotor also includes a longitudinally grooved bearing 42 mounted to its bottom side, the bearing arranged for rotation within the grinder opening 26 of the mill.

FIG. 2 illustrates the relationship of the bearing 42 with the opening 26. Grooves 42' permit ground pepper to pass freely through the opening.

Means for releasably closing the opening 26 of the pepper mill is provided in the embodiment of FIG. 1, by a closure disc 44 releasably attached to bearing 42, as by threaded shank portion 44'. As previously discussed, the grinder shaft 30 to which the grinder rotor 38, bearing 42 and closure disc 44 are attached, it spring loaded by tensioning spring 36 which resiliently urges the assembly normally upward. This causes the closure disc 44 to firmly abut the lower edge of the wall of opening 26, thus closing the opening and preventing the passage of pepper.

Grasping the operator knob 34 and pressing downwardly as the knob is rotated, moves the shaft 30 downward, causing the grinding surface of the rotor 38 to move into contact with the anvil 28. The pepper corns, having gravitated into the feed grooves 40, are thus carried downward into grinding contact between the rotor and the anvil. As the grinder rotor is moved downwardly, so is the closure disc 44 attached thereto. Accordingly, the opening 26 is no longer closed by the disc, and ground pepper is allowed to exit the mill.

Releasing the operator knob 34, results in the tensioning spring 36 urging the grinder rotor and closure disc assembly upward until the disc 44 is brought into firm abutting engagement with the edge of the opening 26, thereby closing the latter against the escape of any pepper grounds which might be clinging to the grinder components.

The conventional structure of the pepper mill of FIG. 3 includes a grinder shaft 46 provided with threads 48 at its upper, flatted portion 46'. An operator crank 50 is provided with a slot 52 (FIG. 4) configured to engage the flat portion of the shaft 46. A lock cap 54 is provided to secure the crank firmly on the shaft against a grinder shaft adjustment screw 56 which is provided between the crank 50 and the body top 12. The screw 56 is arranged to engage the threads 48 on the shaft 46, whereby varying its disposition along the threaded portion of the shaft varies the vertical disposition of the grinder rotor 58 relative to the grinder anvil 60. The courseness of grind of pepper is thus selected by adjustment of the screw 56.

The base portion 10 of the mill body is formed of two sections connected together by a threaded segment 10' to facilitate assembly and disassembly of the mill.

The closure means embodied in FIG. 3 comprises a plate member 62 fixedly mounted to the base portion 10 of the mill beneath the grinder discharge opening. The plate incorporates elongated slots 62'. A slidable closure plate 64, provided with slots 64' is located adjacent plate 62 and is held in place by retainer ring 66 mounted to the base 10 of the mill. The slidable plate 64 includes an outwardly projecting portion which is configured as a finger button 68. As illustrated, the finger button includes a spring centering lug 70 arranged for alignment with a spring retaining socket 72 on the mill body. A retracting spring 74 is provided therebetween to urge the plate outward. A projection 76 on the plate 64 abuts the ring 66 to limit the outward movement of the plate.

As shown in FIG. 3, the plate 64 is in fully retracted condition. In this position, a groove 78 remains between the end of the plate and the base section 10, thus defining the length of inward movement of the slidable plate required to align the slots 64' with slots 62'. In rest position the slots are not aligned, thus preventing passage of ground pepper through the closure assembly. Pressing inward on the finger button while turning the grinder crank allows freshly ground pepper to pass from the grinder through the base opening and the aligned slots. Upon releasing the finger button, the tension of spring 74 urges the slidable plate outward to bring the slots 62' and 64' out of alignment and thereby prevent further flow of pepper.

FIG. 5 embodies the basic closure structure of the mill of the FIG. 3 in a self-contained adapter structure configured for releasable attachment to a conventional pepper mill. The closure structure includes a hollow adapter body 80 with an interior portion configured to receive the lower portion of a conventional pepper mill, as illustrated.

A friction retainer 82 such as a rubber O-ring is arranged in an annular groove in the body so as to project inwardly, and thus frictionally engage the wall of the pepper mill and thereby firmly secure the adapter to the pepper mill body.

The bottom of the adapter body 80 incorporates a central opening, and a fixed plate 84, provided with slots 84' therethrough, is mounted for registery with the opening. A slidable plate 86, provided with slots 86', is located adjacent thereto and is held in position by retainer ring 88 mounted to the base of the adapter body.

Slidable plate 86 includes an outwardly projecting portion which is configured as a finger button 90. The button includes a spring centering lug 92 arranged for alignment with a spring retaining socket 94 on the adapter body, and a retracting spring 96 is interposed therebetween for the purpose of compelling the slidable plate outward. A groove 98 defines the length of movement of the slidable closure plate 86 to align the slots 86' with slots 84'. The operation of the pepper mill provided with this closure adapter is identical to that described for the mill of FIG. 3.

FIGS. 7 illustrates a pepper mill which includes a closure disc arranged to be movable vertically between open and closed positions by means which are operationally independent of the grinder means. In this embodiment the basic grinder mechanism of FIG. 3 is utilized. However, a closure shaft 100 is arranged to movably extend through a hollow grinder shaft 102 and rotor 104. The bottom end of the closure shaft 100 projects centrally from the rotor, and mounts a closure disc 106 configured to abut the inner surface of an annular closure body 108. This body has a threaded portion 110 arranged for releasable threaded connection to the base portion 10 of the pepper mill.

The upper end of the closure shaft 100 extends vertically upward a spaced distance beyond the end of shaft 102 and is fitted at its upper end with a push button 112. The hub 114 of an operator crank 116 is secured to the upper end of shaft 102 for rotating the grinder rotor 104. A spring 118 encircles the shaft 100 between the push button 112 and crank hub 114 and serves to urge the push button, closure shaft 100 and disc 106 resiliently upward to the position in which the disc 106 closes the opening in the body 108.

Means for releasably retaining the closure assembly in open condition is provided by a resilient button retainer 120 mounted to the operator crank 116. The retainer is arranged to releasably hold the closure 100 and disc 106 in lowered position against the tension of the spring 118. By pulling back on the retainer 120 the button 112 is released, whereupon the spring 118 returns the disc 106 to closed position.

FIG. 8 shows a modification of FIG. 7 by replacing the operator crank 116 with an operator knob 122. The structure and mode of operation otherwise are the same.

FIG. 9 illustrates a pepper mill which includes a closure mechanism arranged to be operable automatically between open and closed positions by rotation of the operator knob in opposite directions. The pepper mill includes the same body components as previously described.

As illustrated, the mill includes a hollow grinder shaft 124 provided with a threaded portion at its upper terminal end arranged for attachment to an operator knob 126. The grinder shaft mounts a grinder rotor 128 arranged to cooperate with a grinder anvil 130 mounted to the interior of the base portion 10 in the manner as previously described.

The hollow grinder shaft 124 receives therein a hollow closure drive spindle 132. As illustrated, the lower end of the spindle is configured greater in cross-section so as to provide an abutting shoulder 132' to position the upper end of the spindle slightly above the upper end of the shaft 124. A screw cap 134 is threaded into the spindle top to loosely override the shaft 124 in order to prevent downward movement of the spindle in the shaft. A cavity 136 in the knob 126 accommodates the screw cap.

As illustrated in FIG. 10, openings 138 are provided through the spindle wall configured to receive friction drive balls 140 which are arranged to be movable outward into frictional contact with the interior wall of the shaft. A pressure ball 142 is provided in the interior of the spindle for abutment with balls 140 (FIG. 9), and a spring 144 is arranged to engage the ball 142.

A closure disc 146 includes a centrally located, upwardly projecting closure shaft 148 arranged with threads 150 which cooperate with threads incorporated in the lower portion of the spindle 132. The shaft 148 includes a guide section 152 which extends further into the interior of the spindle, the upper edge of the guide section abutting the bottom of the spring 144. In the closed position illustrated, the closure disc 146 abuts the tapered wall 154 of the closure body 156. The body is provided with threads 158 for cooperation with threads on the mill body, thus making the closure body removably for assembly, disassembly and maintenance of the mill components.

The closure shaft 148 includes outwardly projecting pins 160 arranged to be received in vertical guide slots 162 in the body base portion 10. The length of these slots determine the length of movement permitted the closure assembly during unscrewing of the shaft 148 from the spindle 132. It is the retention of the pins 160 in the slots 152 that prevents rotation of the closure shaft 148 during rotation of the grinding assembly.

Beginning with the closed position illustrated, the operation of the automatic closure pepper mill is as follows: With the closure shaft 148 fully threaded into the spindle, closing the disc 146 against the wall 154, the spring 144 is in compressed condition exerting significant pressure on the ball 142 which, in turn, presses friction balls 140 outwardly firmly against the shaft 124. Turning the operator knob 126 and shaft 124 in the direction to grind pepper also truns the spindle 132 by virtue of the frictional contact of the balls 140. With the closure shaft pins 160 captured in slots 162, the closure shaft is prevented from turning, and thus unscrews from the spindle, moving the closure disc downwardly, and opening the bottom of the mill. At a predetermined length of movement the pins 160 engage the bottom end of the slots 162 provided by the upper end of the closure body 156. The closure shaft thus is prevented from unscrewing further.

At this point the tension of spring 144 on the pressure ball 142 is slightly reduced, and consequently the force exerted by the friction balls 140 on the grinder shaft 124 is also reduced. The grinder shaft and rotor 128 continue to be rotatable, but the spindle remains stationary with the closure disc and shaft since the friction balls 140 are now in slipping frictional engagement with the shaft 124.

The spindle thus is prevented from turning with the grinder shaft further in that direction. However, the knob may continue to be rotated to grind a desired amount of pepper which will fall by gravity through the mill and past the open closure disc 146. However, since the friction balls 140 still frictionally engage the grinder shaft, turning the knob 126 and shaft 124 in the opposite direction causes the spindle to turn therewith. The spindle thus rotates and the closure disc assembly rethreads into the spindle, bringing the disc 146 back into sealing position with the closure body 156.

Thus, it is understood that rotation of the operator knob in the grinding direction causes the closure disc assembly to automatically move downward into open position, thus allowing freshly ground pepper to exit the mill. Rotating the operator knob in the reverse direction causes the closure disc to move automatically into abutment with the closure body, and thus closing the bottom of the mill.

It will be apparent to those skilled in the art that various changes may be made in the size, shape number, type and arrangements of parts described hereinbefore without departing from the spirit of this invention and the scope of the appended claims.

Having thus described my invention and the manner in which it may be used, I claim:

1. A pepper mill, comprising:
   (a) a hollow body member forming a pepper corn reservoir and having a bottom outfeed opening,
   (b) a rotary grinder assembly in the body configured to grind pepper corns upon rotation of the grinder assembly and deliver the pepper grounds to said bottom outfeed opening,
   (c) movable closure means registering with the bottom outfeed opening for opening and closing the latter, and
   (d) connecting means interengaging the closure means and the rotary grinder assembly for moving the closure means to open the bottom outfeed opening during rotational pepper corn grinding operation of said rotary grinder assembly and for moving the closure means to close the bottom outfeed opening upon cessation of the rotational grinding operation of the rotary grinder assembly.

2. A pepper mill, comprising:
   (a) a hollow body member forming a pepper corn reservoir and having a bottom outfeed opening,
   (b) a rotary grinder assembly in the body configured to grind pepper corns upon rotation of the grinder assembly and deliver the pepper grounds to said bottom outfeed opening, and
   (c) closure means associated with the mill registering with the bottom outfeed opening for opening and closing the latter,
   (d) said rotary grinder assembly including a grinder anvil and a rotatable rotor and shaft arranged for vertical movement between a raised, non-grinding position a spaced distance above the anvil and a lowered, grinding position wherein said rotor engages said anvil for rotation thereagainst to grind pepper corns, (e) said closure means including a closure disc mounted for vertical movement with the rotor and shaft of said rotary grinder assembly, the closure disc configured to close the bottom outfeed opening of the mill when the rotor and shaft of said grinder assembly is in said raised, non-grinding position and to open the bottom outfeed opening of the mill when the rotor and shaft of said grinder assembly is moved vertically to its said lowered, grinding position.

3. The pepper mill of claim 2 including spring means engaging the rotor and shaft of said grinder assembly to urge the latter to its raised, non-grinding position and said closure disc to its position closing the bottom outfeed opening of the mill.

4. A pepper mill, comprising:
(a) a hollow body member forming a pepper corn reservoir and having a bottom outfeed opening,
(b) a rotary grinder assembly in the body configured to grind pepper corns upon rotation of the grinder and deliver the pepper grounds to said outfed opening, and
(c) closure means registering with the bottom outfeed opening for opening and closing the latter,
(d) connecting means interengaging the closure means and the rotary grinder assembly so that rotation of the grinder rotor in the grinding direction automatically moves the closure means vertically to open the outfeed opening, and rotation of the grinder rotor in the opposite direction moves the closure disc vertically to close the outfeed opening.

5. A pepper mill, comprising:
(a) a hollow body member forming a pepper corn reservoir and having an outfeed opening,
(b) a grinder assembly in the body configured to grind pepper corns and deliver the pepper grounds to said outfeed opening, and
(c) closure means associated with the mill for releasably intercepting the outfeed opening of the mill,
(d) the closure means configured to engage the grinder assembly so that rotation of the grinder assembly in one direction automatically moves the closure means to open the outfeed opening of the mill body and rotation of the grinder assembly in the opposite direction automatically moves the closure means to close the outfeed opening of the mill body,
(e) the grinder assembly including a hollow shaft mounting a grinder rotor at its lower end and an operator knob at its upper end, and the closure means further includes a hollow spindle extending through and retained rotatably within the hollow grinder shaft, the spindle mounting, for vertical movement relative thereto, a closure disc and shaft assembly configured to releasably intercept the outfeed opening of the mill body, and spring tensioned friction balls are arranged to engage the inner surface of the hollow grinder shaft for releasably securing the spindle to the shaft for rotation therewith.

* * * * *